Jan. 7, 1958          H. C. MARTIN          2,818,645
DOUGHNUT AND PATTY SHELL CUTTER
Filed April 30, 1956
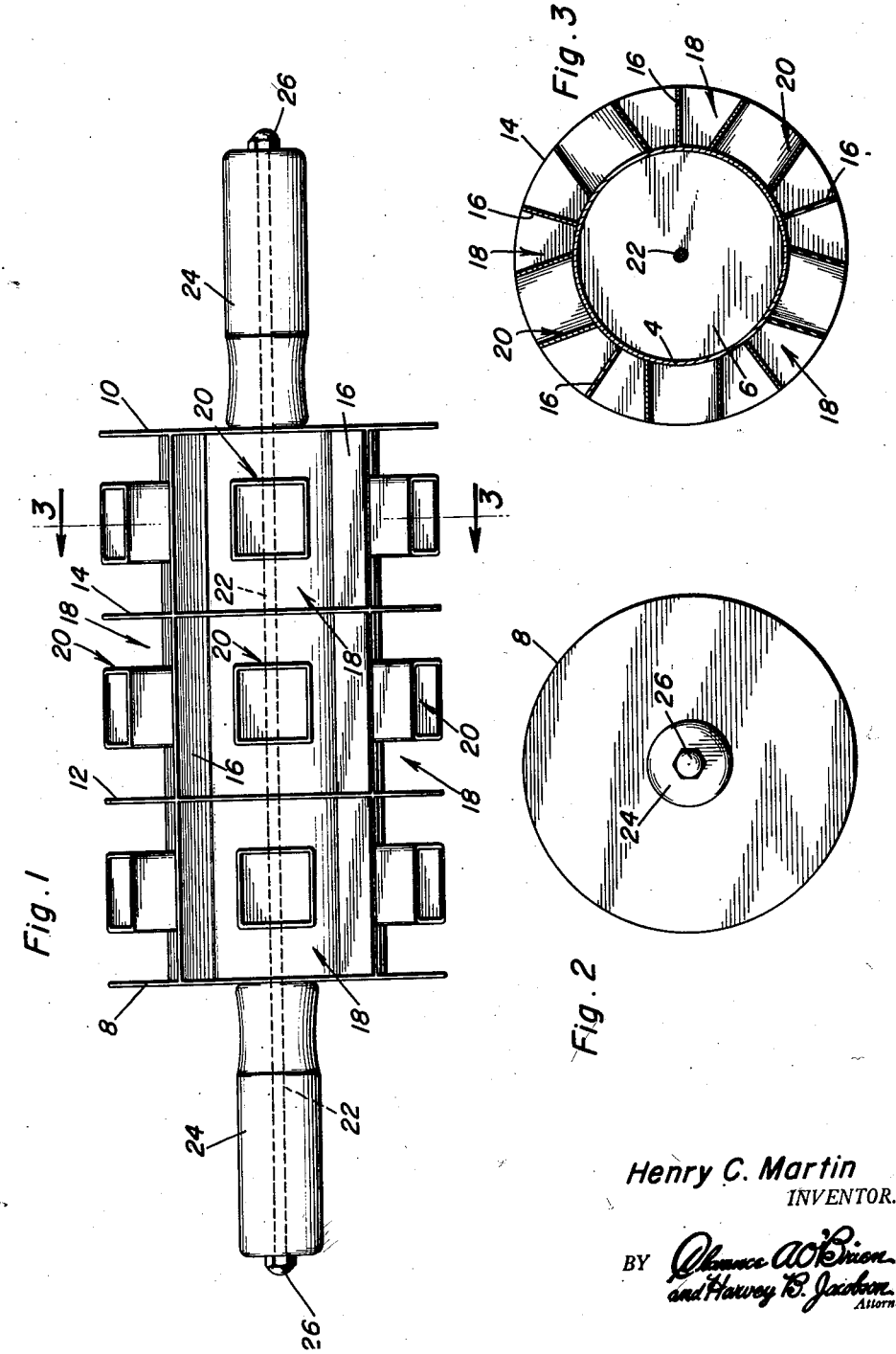
Henry C. Martin
        *INVENTOR.*
BY *Clarence A. O'Brien*
   *and Harvey B. Jacobson*
               *Attorneys*

2,818,645

DOUGHNUT AND PATTY SHELL CUTTER

Henry C. Martin, Sante Fe, N. Mex.

Application April 30, 1956, Serial No. 581,631

2 Claims. (Cl. 30—306)

The present invention relates to a manually usable handle-equipped implement for imprinting and cutting a sheet or equivalent batch of dough and which resembles a rolling-pin but is herein referred to as a roller-type cutter, one which has been designed especially for use in commercial establishments where size and uniformity in cutting products is economically and otherwise important.

More specifically, the invention has to do with a horizontally elongate roller which has axially aligned freely rotatable hand-grips or handles at its ends, the roller itself being in the form of a hollow cylinder having closed ends and having its peripheral surface of cellular form, the cells defining rows of what may be called pockets, each pocket, in turn, having a main outer portion and a central inner portion with said portions cooperating in cutting dough in a manner which is utilized, primarily, in preparing so-called square doughnuts.

In carrying out a preferred embodiment of the invention longitudinally spaced ring-like flanges encircle or surround the cylinder and are connected together by lengthwise cooperating flanges, this in a manner to form dough cutting and molding pockets. At the center of each main pocket is a small receptacle-like pocket or cutter which cuts the core-like plug in a manner to provide for the usual hole in the finished doughnut.

In carrying out the over-all concept relatively large size roller-type cutters will be fabricated from stainless steel with wooden handles which rotate freely at the ends for everyday use at a bakery. The same construction made on a smaller scale and molded from commercial plastic is adapted for home use.

The invention is also designed as a time and labor saver by reason of the fact that moving the cellular or pocketed surface of the roller or cylinder over the batch of dough accomplishes the dough cutting results and minimizes gathering and rerolling as is usually required with conventional-type cutters.

Other objects, features and advantages will become more readily apparent from the following description and the accompanying sheet of illustrative drawings.

In the drawings, wherein like numerals are employed to designate like parts through the views:

Figure 1 is an elevational view of a roller-type dough cutter constructed in accordance with the principles of the present invention;

Figure 2 is an end view of the same; and

Figure 3 is a section on the line 3—3 of Figure 1 looking in the direction of the arrows.

Referring now to the drawings it will be seen that the roller proper is in the form of an elongated hollow cylinder or drum 4 and plates having their central portions functioning as enclosures 6 for the ends of said cylinder. The end plates are of a diameter appreciably greater than that of the cylinder and therefore the outer annular marginal portions extend radially beyond the peripheral surface of the cylinder and define what are herein referred to as ring-like end flanges 8 and 10, respectively. Encircling the intermediate portion of the cylinder are longitudinally spaced parallel annular or ring-like flanges 12 and 14 and the four flanges are equally spaced and are of corresponding outside diameter to provide the circumferential cutting blades and also the end walls of the cells or pockets. Also circumferentially arranged around the periphery or surface are lengthwise flanges 16 which are joined with the flanges 8, 10, 12 and 14 to define rows of main or outer pockets of a suitable depth, each pocket denoted by the numeral 18. At the center of each pocket 18 there is a tubular socket-like member 20 and this in turn constitutes what may be described either as a pocket or cutter. In any event it shapes and cuts a plug-like center in a seemingly obvious manner and hence each cutter therefore comprises an outer marginally walled main pocket 18 and an inner auxiliary pocket 20. It is to be noted too that the flanges 16 radiate from the cylinder surface so that they are in slightly convergent relationship and this construction facilitates dislodging any dough that may tend to adhere in the main pocket. Using the proper dough and dusting the surfaces with flour makes it possible to roll the device over a predetermined swath of dough to do the shaping and cutting job with a minimum of effort and time.

A central rod or equivalent member 22 is suitably mounted in the end plates and extended through and beyond the same to provide journals and the wooden or equivalent hand-grips 24 are freely mounted for rotation on the extended ends and held in place by the retaining heads or nuts 26.

Since the invention is designed for both commercial and domestic use the modes of using it by different users will not herein be dwelled upon.

As is reasonably clear, the invention disclosed lends itself also to forming the walls of patty shells. Under the "old system" the dough is rolled out to a thickness of approximately ⅛ inch and a round cutter is used to make the outside. Then, a second round, but smaller cutter, is used to cut out the center. This means two operations for a single shell. By using my roller cutter, a large number of patty shells can be cut at once, just as is done with doughnuts. The centers, which are cut by the inner squares, are gathered together in a mass and rolled out to the proper thickness again and they may be cut in a like manner. With the use of the single operation, ring or round cutters one not only had to pick up the centers but also the dough which would be heft outside of the large ring.

This invention cuts out only the wall of the patty shell. The trend in this field is to do away with bottom or base of shells. Actually, the plate on which the product is eaten provides the needed bottom. All that is needed is the containing wall.

The round patty shell quite often collapses, leans and is irregular in shape. Experience with the herein disclosed roller cutter shows that the square shape prevents collapsing or leaning of patty shells. If desirable, a bottom can be placed on a shell before it is baked but this is a separate operation.

Actually in the cutting process, whether it be doughnuts or patty shells, only the outside ¼ inch to ½ inch cutting edges of the cutter are used. According to prevailing practices practically all dough is rolled very thin, the thickest being doughnut which is rolled to an approximate thickness of ¼ inch. Thus, the dough never "fills" the cells or pockets.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in producing doughnuts which are uniform in size and square in shape; an elongated cylinder, a disk fastened centrally to each end of said cylinder, said disks being of a diameter greater than the cross-sectional diameter of said cylinder and cooperating with the cylinder in providing a roller, the marginal edges of said disks also serving as dough cutters, axially aligned hand-grips fixed centrally to and projecting outwardly beyond said disks, a plurality of longitudinally spaced rings encircling said cylinder and providing endless radial dough cutters, and lengthwise flanges extending along the peripheral surface of said cylinder between the radially projecting portions of said disks and rings and disposed at right angles to the latter and secured to said peripheral surface, the outer edges of said flanges providing additional cutters and giving the surface of the cylinder a honeycomb-like appearance and also defining uniform circumferentially extending rows of square doughnut cutters, each individual cutter having a small centralized rectangular hole cutter mounted on and carried by the peripheral surface of said cylinder.

2. A roller type doughnut cutter comprising a pair of disks, a cylinder having its respective end portions fastened to the interior central surface portion of said disks, the cross-sectional diameter of said cylinder being appreciably less than the diameter of said disks and the cylinder and disks thus cooperating and providing a roller, said disks being centrally provided with axially alined outwardly extending handles to facilitate operating the roller, longitudinally extending flanges radial to the peripheral surface of the cylinder and secured at their inner ends to said surface between the respective disks, longitudinally spaced ring-like flanges encircling the periphery of the cylinder at longitudinally spaced points and at right angles to said first named flanges, the outer edges of the disks, and all of said flanges serving as cutters, and the arrangement of the flanges giving the surface of the cylinder a honeycomb effect and serving to define uniform circumferential rows of generally rectangular cutters for individual doughnuts, each doughnut cutter, as an entity, being of pocket-like form and being provided at its center with a rectangular hole cutter, said hole cutter being fastened to the cooperating peripheral portion of said cylinder.

References Cited in the file of this patent
UNITED STATES PATENTS

| 1,382,677 | Schmitz | June 28, 1921 |
| 1,615,569 | Christensen | Jan. 25, 1927 |
| 2,007,768 | Olevin | July 9, 1935 |

FOREIGN PATENTS

| 469,599 | France | May 25, 1914 |